(12) United States Patent
Park (10) Patent No.: US 12,524,167 B2
(45) Date of Patent: Jan. 13, 2026

(54) STORAGE SYSTEM IMPROVING ENCRYPTION INTEGRITY OF DATA AND OPERATING METHOD THEREOF

(71) Applicant: SK hynix Inc., Icheon-si (KR)

(72) Inventor: Jong Hyun Park, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/771,247

(22) Filed: Jul. 12, 2024

(65) Prior Publication Data

US 2025/0272008 A1    Aug. 28, 2025

(30) Foreign Application Priority Data

Feb. 26, 2024  (KR) .......................... 10-2024-0027311

(51) Int. Cl.
*G06F 3/06* (2006.01)

(52) U.S. Cl.
CPC .......... *G06F 3/0622* (2013.01); *G06F 3/0655* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 7,325,052 B1 * | 1/2008 | Motoyama | G06F 21/554 358/1.14 |
| 8,909,942 B1 * | 12/2014 | Obukhov | G06F 12/1408 257/659 |
| 9,111,621 B2 * | 8/2015 | Krutzik | G11C 16/22 |
| 11,886,372 B1 * | 1/2024 | Ying | G06F 13/4221 |
| 2001/0025340 A1 * | 9/2001 | Marchant | G06F 21/6272 713/150 |
| 2005/0138522 A1 * | 6/2005 | Silvus | H03M 5/145 714/758 |
| 2006/0004957 A1 * | 1/2006 | Hand, III | G06F 12/0866 711/E12.019 |
| 2006/0005074 A1 * | 1/2006 | Yanai | G06F 3/0619 714/6.32 |
| 2008/0189477 A1 * | 8/2008 | Asano | G06F 12/0246 711/E12.008 |

(Continued)

OTHER PUBLICATIONS

Vinicius Fulber Garcia, "How to Share a Key in Symmetric Cryptography?", Nov. 4, 2022, pp. 1-6, https://web.archive.org/web/20221117030328/https://www.baeldung.com/cs/symmetric-cryptography (Year: 2022).*

(Continued)

*Primary Examiner* — Christopher D Birkhimer (57) ABSTRACT

A storage system may include a first device including a transmission circuit configured to generate encrypted first information by encrypting first information of a transmission target message, to generate encrypted second information by encrypting second information of the transmission target message, and to transmit the encrypted first information and the encrypted second information, and a second device including a reception circuit configured to decrypt the encrypted first information by receiving the encrypted first information and the encrypted second information from the first device and to store the first information that has been decrypted and the encrypted second information in a memory device.

14 Claims, 7 Drawing Sheets

(56) References Cited

U.S. PATENT DOCUMENTS

| | | | | |
|---|---|---|---|---|
| 2009/0172267 | A1* | 7/2009 | Oribe | G11C 16/3418 |
| | | | | 711/E12.008 |
| 2009/0177895 | A1* | 7/2009 | Murayama | G06F 21/6236 |
| | | | | 711/E12.001 |
| 2009/0220088 | A1* | 9/2009 | Lu | G06F 21/554 |
| | | | | 713/189 |
| 2011/0161784 | A1* | 6/2011 | Selinger | G06F 11/1016 |
| | | | | 714/E11.002 |
| 2014/0153034 | A1* | 6/2014 | Fukushima | H04N 1/21 |
| | | | | 358/1.14 |
| 2014/0219001 | A1* | 8/2014 | Patapoutian | G11C 13/0033 |
| | | | | 365/148 |
| 2015/0339188 | A1* | 11/2015 | Hu | G06F 11/3034 |
| | | | | 714/704 |
| 2015/0350082 | A1* | 12/2015 | Pawlowski | G06F 3/0611 |
| | | | | 370/412 |
| 2018/0307848 | A1* | 10/2018 | Leiseboer | G06F 21/78 |
| 2020/0310659 | A1* | 10/2020 | Kannan | G06F 3/0688 |
| 2021/0089388 | A1* | 3/2021 | Makaram | H04L 9/3242 |
| 2021/0234673 | A1* | 7/2021 | Kurian | H04L 9/3234 |
| 2021/0357125 | A1* | 11/2021 | Mendes | G06F 13/4004 |
| 2022/0066636 | A1* | 3/2022 | Taki | G06F 3/0679 |
| 2022/0174051 | A1 | 6/2022 | Wang | |
| 2023/0224082 | A1* | 7/2023 | Wang | H04L 1/0041 |
| 2023/0261867 | A1* | 8/2023 | Makhalov | H04L 9/0822 |
| | | | | 713/189 |
| 2023/0289089 | A1* | 9/2023 | Mastenbrook | G06F 3/0671 |
| 2023/0359369 | A1* | 11/2023 | Muthiah | G06F 3/0655 |
| 2023/0409332 | A1* | 12/2023 | Safranek | G06F 9/3877 |
| 2024/0184477 | A1* | 6/2024 | Agarwal | G06F 3/0604 |
| 2024/0378165 | A1* | 11/2024 | Kim | G06F 13/4221 |

OTHER PUBLICATIONS

Dana Neustadter, "Protecting Data over PCIe & CXL in Cloud Computing", Jul. 17, 2022, pp. 1-11, https://www.synopsys.com/articles/security-ide-ip.html (Year: 2022).*

* cited by examiner

STORAGE SYSTEM IMPROVING ENCRYPTION INTEGRITY OF DATA AND OPERATING METHOD THEREOF

CROSS-REFERENCES TO RELATED APPLICATION

The present application claims priority under 35 U.S.C. § 119(a) to Korean Patent Application No. 10-2024-0027311, filed on Feb. 26, 2024, in the Korean Intellectual Property Office, which is incorporated herein by reference in its entirety.

BACKGROUND

1. Technical Field

Various embodiments relate to a computing system, and more particularly, to a storage system that improves the encryption integrity of data and an operating method thereof.

2. Related Art

In a computing system in which a plurality of computing devices constitutes a network, encryption technology is often used to ensure the confidentiality of messages that are transmitted and received between devices.

An integrity and data encryption (IDE) engine is an encryption device for protecting a message that is transmitted through a link of a device included in a computing system.

An object to be protected by IDE is a message transmitted through a link. Accordingly, in order to protect the message in a layer other than the link, a separate encryption scheme or device may be required.

There is a need for a method capable of protecting a message without influencing the power-performance-area (PPA) of a computing system because the PPA is affected when a separate encryption module is introduced.

SUMMARY

An embodiment of the present technology provides a storage system that improves the encryption integrity of data that have passed through a link layer by protecting the data without a separate encryption module, and an operating method of the storage system.

In an embodiment, a storage system may include a first device including a transmission circuit configured to encrypt a first information of a transmission target message, to encrypt a second information of the transmission target message, and to transmit the encrypted first information and the encrypted second information, and a second device including a reception circuit configured to receive the encrypted first information and the encrypted second information from the first device, and to decrypt the encrypted first information and to store the decrypted first information and the encrypted second information in a memory device.

In an embodiment, an operating method of a storage system including a first device and a second device may include generating, by the first device, encrypted first information by encrypting a first information of a transmission target message and generating encrypted second information by encrypting a second information of the transmission target message, transmitting, by the first device, the encrypted first information and the encrypted second information, decrypting, by the second device, the encrypted first information received from the first device, and storing, by the second device, the first information that has been decrypted and the encrypted second information in a memory device.

In an embodiment, a storage system may include a first device configured to generate encrypted first information by encrypting first information other than a data slot from a transmission target message including the data slot, to generate encrypted second information by encrypting second information including the data slot, and to transmit an encrypted message including the encrypted first information and the encrypted second information through a physical interface circuit.

In an embodiment, a storage system may include a second device configured to extract encrypted first information from an encrypted message that has been received through a physical interface circuit, to generate first information by decrypting the encrypted first information using encryption information that has been received through the physical interface circuit, to extract encrypted second information from the encrypted message, and to store the first information that has been decrypted and the encrypted second information in a memory device.

According to the present technology, the PPA of the storage system can be improved by improving the confidentiality of data that have passed through a link without a separate encryption module.

DETAILED DESCRIPTION

Hereinafter, embodiments of the present technology will be described in detail with reference to the accompanying drawings.

Figure 1:
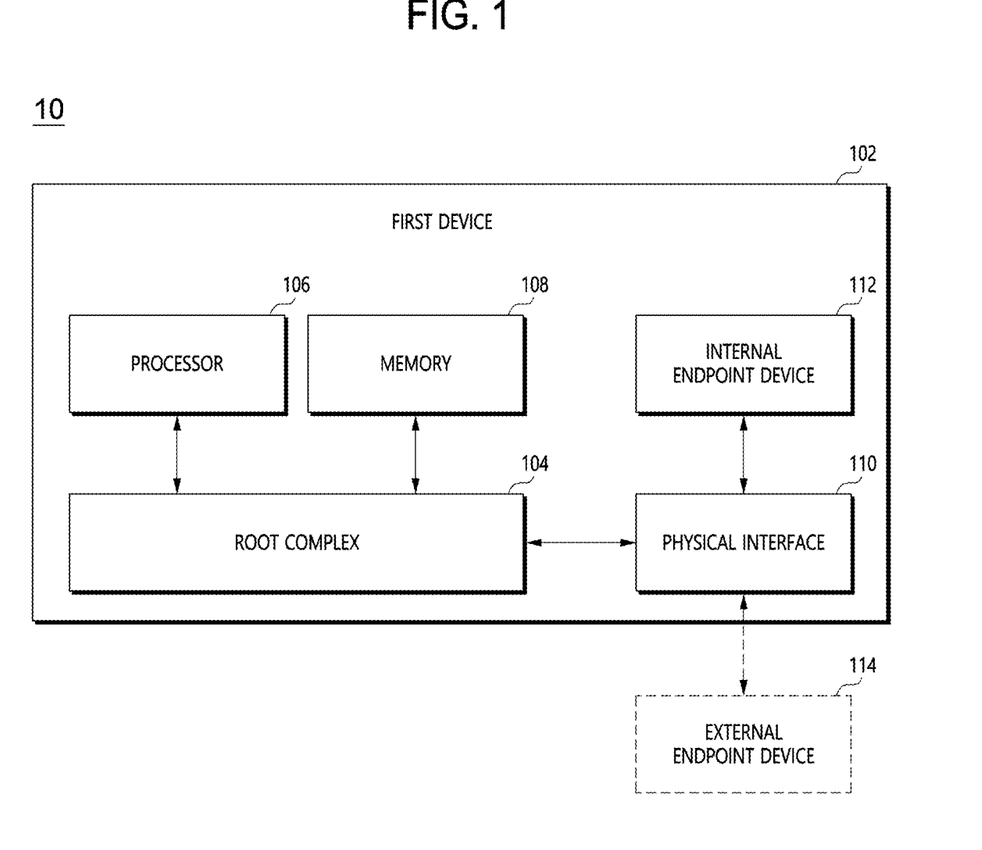
FIG. 1 is a construction diagram of a storage system according to an embodiment of the disclosure.

FIG. 1 is a construction diagram of a storage system according to an embodiment of the disclosure.

Referring to FIG. 1, a storage system 10 according to an embodiment may include an arbitrary number of first devices 102 and an arbitrary number of second devices 114, which communicate with the first device 102 through peripheral component interconnect express (PCIe) or another data bus (not illustrated).

The first device 102 may be a host device or a data management device, for example. The second device 114 may be an external endpoint device, which may be, for example, a PCIe device, a data storage device or a server blade.

The first device 102 may include a root complex 104, a processor 106, memory 108, an internal endpoint device 112, and a physical interface 110.

The root complex 104 may facilitate the formation of a network for the communication of data among the processor 106, the memory 108, an arbitrary number of internal endpoint devices 112 that are electrically coupled through the physical interface 110, and the external endpoint device 114.

For example, the root complex 104 may include a circuit, interfaces, or a program code for recognizing and communicating with devices electrically coupled to the storage system 10, such as, the internal endpoint device 112 and the external endpoint device 114. The root complex 104 may allocate resources to the devices or release resources allocated to the devices. In an embodiment, the root complex 104 may operate according to a data communication protocol, such as PCIe.

The internal endpoint device 112 and the external endpoint device 114 may communicate with the processor 106 and/or the memory 108 through the root complex 104.

The processor 106 may include a circuit, interfaces, or a program code for controlling operations of components included in the storage system 10. In an embodiment, the processor 106 may include a central processing unit (CPU), an advanced RISC machine (ARM), or an application specific integrated circuit (ASIC).

The memory 108 may store data, commands, and program codes that are necessary for an operation of the storage system 10, and may include volatile and/or nonvolatile memory devices.

The memory 108 may store program codes to execute one or more operating systems (OSs) or virtual machines (VMs).

The processor 106 may execute the one or more OSs or VMs by driving program codes that have been stored in the memory 108.

The physical interface 110 may be an adapter that electrically couples the internal endpoint device 112 and the external endpoint device 114 to the first device 102. In an embodiment, the physical interface 110 may include a universal serial bus (USB) adapter, a peripheral component interconnect (PCI) adapter, a PCIe adapter, a small computer system interface (SCSI) adapter, a serial AT attachment (SATA) adapter, or a nonvolatile memory express (NVMe) adapter.

The internal or external endpoint device 112 or 114 may be a semiconductor device including an interface circuit that communicates with the root complex 104 according to a communication protocol of the root complex 104, and may be a semiconductor device included in a storage device, for example.

Figure 2:
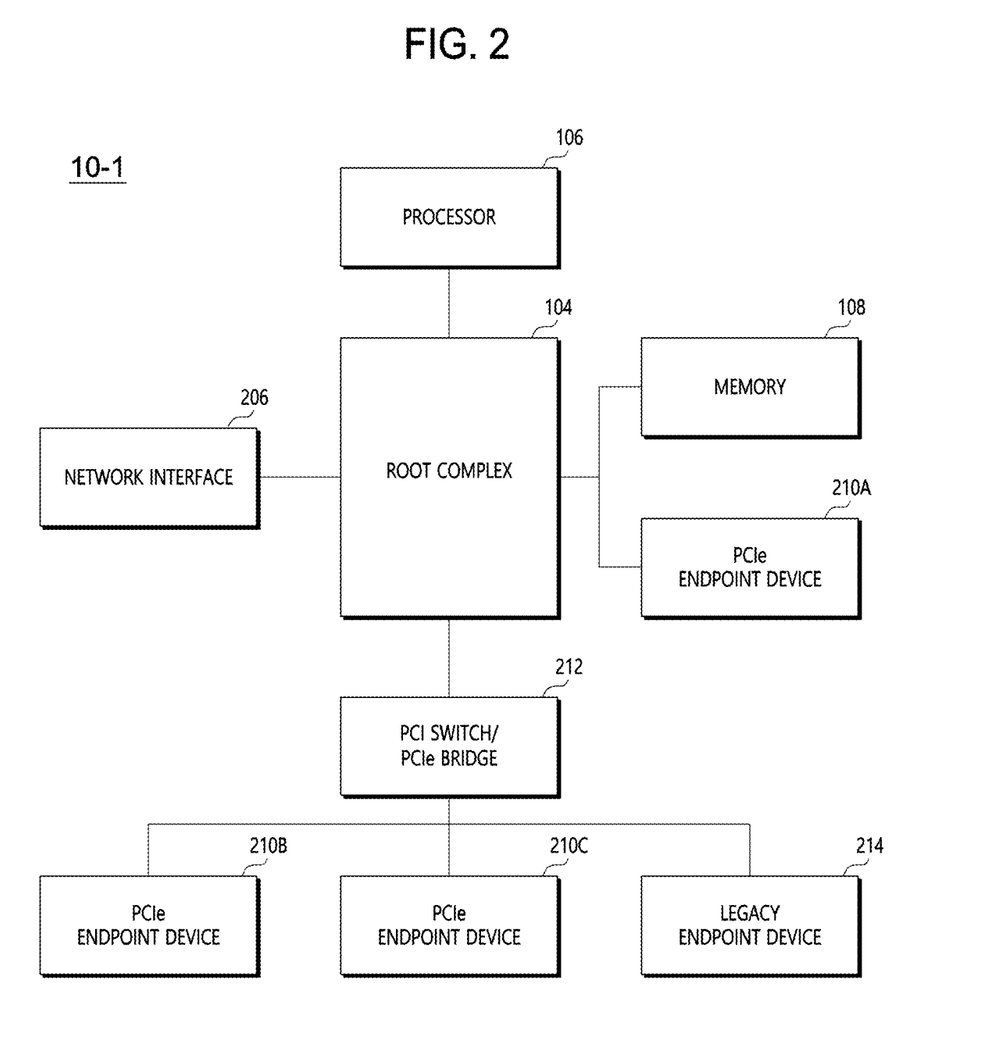
FIG. 2 is a construction diagram of a storage system according to an embodiment of the disclosure.

FIG. 2 is a construction diagram of a storage system according to an embodiment of the disclosure.

Referring to FIG. 2, a storage system 10-1 may include a root complex 104, a processor 106, memory 108, at least one network interface 206, a plurality of PCIe endpoint devices 210A, 210B, and 210C, a PCI switch/PCIe bridge 212, and a legacy endpoint device 214. The PCI switch and the PCIe bridge may be separately constructed.

The plurality of PCIe endpoint devices 210B and 210C may each include an interface circuit that communicates with the root complex 104 through the PCI switch 212. The legacy endpoint device 214 may communicate with the root complex 104 through the PCIe bridge 212.

Figure 3:
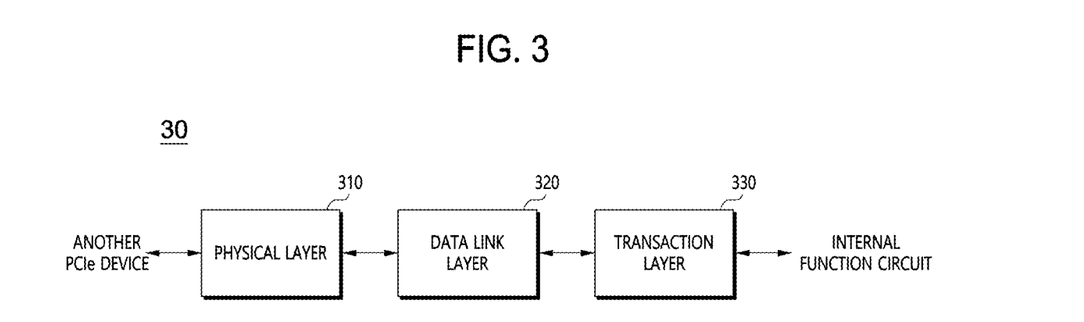
FIG. 3 is a diagram for describing a message transmission and reception concept of a PCIe device.

FIG. 3 is a diagram for describing a message transmission and reception concept of a PCIe device.

The root complex 104 and the endpoint devices 112, 114, 210A, 210B, and 210C illustrated in FIG. 1 or 2 may each be denoted as a PCIe device, and may each communicate with another PCIe device through at least one interface model 30, which is provided in each PCIe device.

For example, when a root complex 104 and endpoint devices 112, 114, 210A, 210B, and 210C each perform communication based on a PCIe protocol, each interface model 30 may transmit and receive messages through a physical layer 310, a data link layer 320, and a transaction layer 330.

Although not illustrated in FIG. 3, the physical layer 310 may include a driver, an input and output buffer, a parallel to serial/serial to parallel conversion circuit, or an impedance matching circuit, and may convert a digital signal into an analog signal or convert an analog signal into a digital signal. When a message is transmitted, the physical layer 310 may serially convert messages that are received from the data link layer 320, and may transmit a message by using a frequency and bandwidth that are compatible with another PCIe device that will receive the message. When a message is received, the physical layer 310 may transmit messages that are received from another PCIe device to the data link layer 320 by converting the messages in parallel.

The data link layer 320 may play a role as an intermediate step between the transaction layer 330 and the physical layer 310. The data link layer 320 may encrypt a transmission target message, and may detect and correct an error of a received message. That is, link management and message integrity may be implemented through the data link layer 320.

The transaction layer 330 may provide the data link layer 320 with a message to be transmitted by packetizing the message, or may combine message packets that are received from the data link layer 320.

Figure 4:
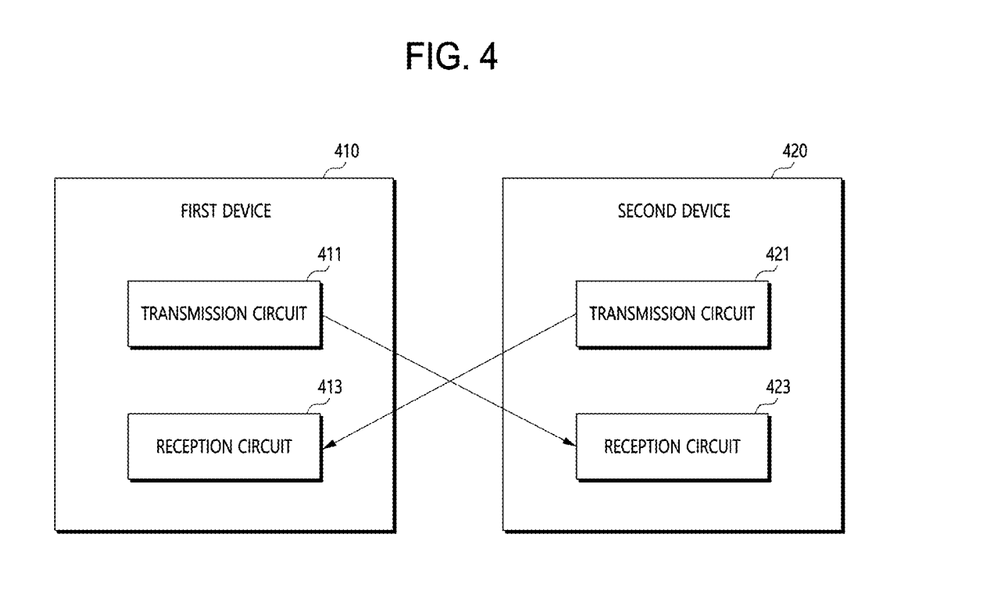
FIG. 4 is a diagram for describing interfacing between PCIe devices according to an embodiment of the disclosure.

FIG. 4 is a diagram for describing an interface between PCIe devices according to an embodiment of the disclosure.

Referring to FIG. 4, a first device 410 may include a transmission circuit 411 and a reception circuit 413. A second device 420 may include a transmission circuit 421 and a reception circuit 423.

In an embodiment, the first device 410 may be a host device. The first device 410 may be a data management device, for example. The second device 420 may be an endpoint device. The second device 420 may be a PCIe device, for example, a data storage device or a server blade.

The transmission circuit 411, 421 may separate a transmission target message into additional information, first information, and second information in order to transmit the message to another PCIe device. The message may be separated into a plurality of flits. Each flit may include a flit header (FLIT HEADER) and a plurality of slots. A slot may include an arbitrary number of header slots (HEADER SLOTs), an arbitrary number of generic slots (GENERIC SLOTs), and an arbitrary number of data slots (DATA SLOTS). In an embodiment, the first information may include a header slot (HEADER SLOT) and a generic slot (GENERIC SLOT). The second information may include a data slot (DATA SLOT). The additional information may include a flit header (FLIT HEADER).

The transmission circuit 411 may generate and encrypt a protection code for the first information, and may also encrypt the second information.

In an embodiment, the transmission circuits 411, 421 may transmit, to respective reception circuits, encryption information (e.g., an encryption key, a counter value, or an initiation vector) that is used to encrypt the first information, but might not transmit, to the reception circuit, encryption information (e.g., an encryption key, a counter value, or an initiation vector) that is used to encrypt the second information.

The transmission circuits 411, 421 may generate a first message authentication code (MAC) for an encrypted message in which the additional information, encrypted first information, and encrypted second information of a message to be transmitted have been combined.

The encrypted message and the first MAC may be transmitted to another PCIe device through a physical interface circuit.

The reception circuits 413, 423 may receive the encrypted message and the first MAC from another PCIe device through the physical interface circuit.

The reception circuits 413, 423 may generate a second MAC from the encrypted message, and may check the validity of the received first MAC by comparing the generated second MAC with the received first MAC.

The reception circuits 413, 423 may separate an encrypted message into the additional information, the encrypted first information, and the encrypted second information, may decrypt the encrypted first information, and may check the integrity of the encrypted message.

The reception circuits 413, 423 may use encryption information (e.g., an encryption key, a counter value, or an initiation vector) that is received from the transmission side in order to decrypt the first information. The reception circuits 413, 423 will not decrypt the encrypted second information because encryption information (e.g., an encryption key, a counter value, or an initiation vector) of the second information is not provided by the respective transmission circuit.

The reception circuits 413, 423 may store the additional information, the first information that has been decrypted, and the encrypted second information in a memory device.

In response to a read request for the second information, the transmission circuits 411, 413 may generate a protection code by reading the first information associated with the second information from the memory device, and may generate the encrypted first information by generating and encrypting the protection code.

The transmission circuits 411, 421 may read, from the memory device, the additional information that is associated with the second information, and the second information that has been stored in an encrypted state, and may generate a first MAC for an encrypted message in which the additional information, the encrypted first information, and the encrypted second information have been combined.

The encrypted message and the first MAC may be transmitted to a PCIe device that has requested to read the second information through the physical interface circuit.

There is a need for a method capable of improving the confidentiality of data other than using the data link layer because the IDE engine only addresses the integrity of a message in the data link layer.

In the disclosed technology, data that are encrypted and transmitted by a transmission side may be stored in a memory device in an encrypted state without decrypting the data. The confidentiality of data can be improved by preventing the leakage of encryption information (e.g., an encryption key, a counter value, or an initiation vector) that is used to encrypt the data because the encryption information is not provided to the reception side and is managed on the transmission side.

Figure 5:
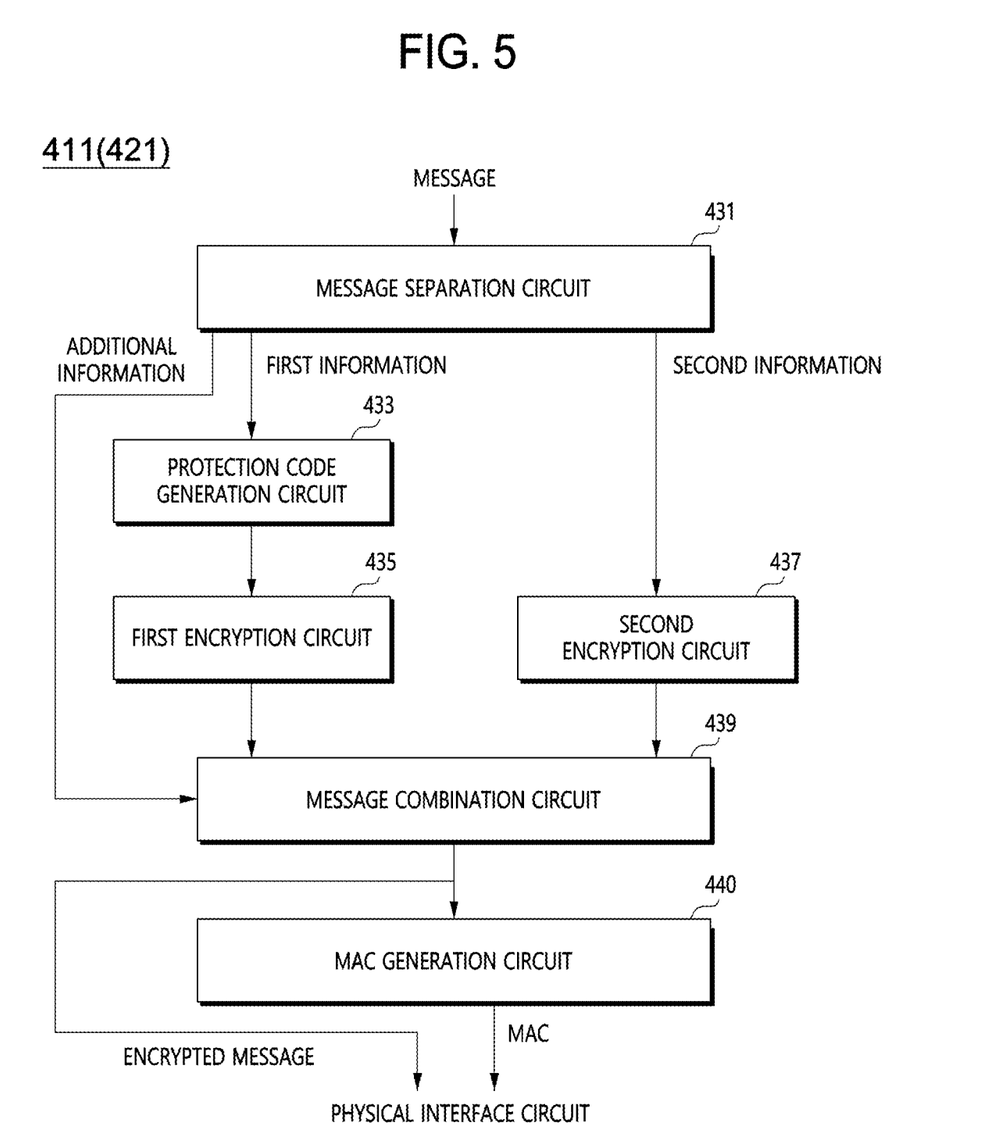
FIG. 5 is a diagram of a transmission circuit according to an embodiment of the disclosure.
Figure 6:
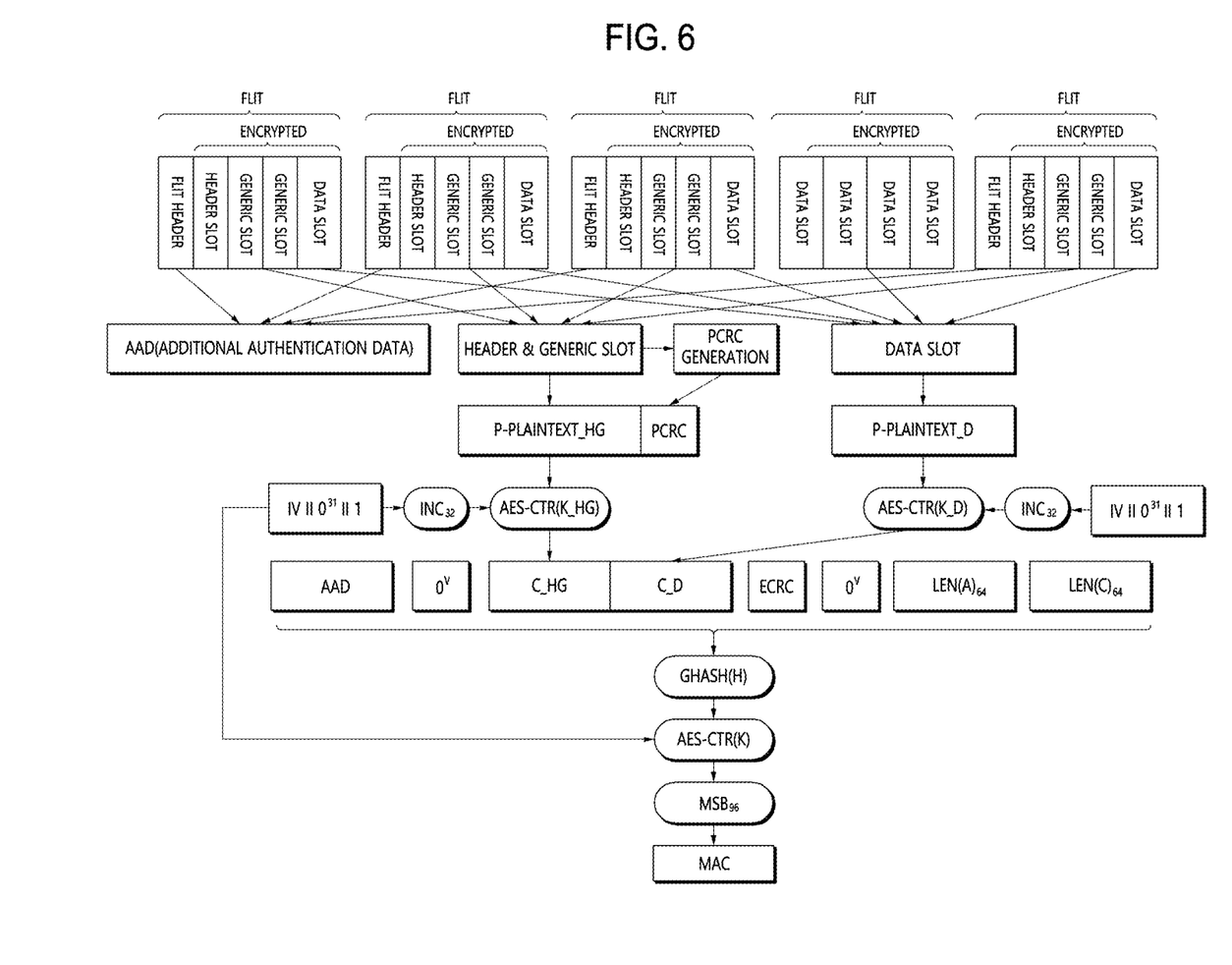
FIG. 6 is a diagram for describing a method of transmitting a message according to an embodiment of the disclosure.

FIG. 5 is a construction diagram of a transmission circuit according to an embodiment of the disclosure. FIG. 6 is a conceptual diagram for describing a method of transmitting a message according to an embodiment of the disclosure.

Referring to FIG. 5, transmission circuits 411, 421 may include a message separation circuit 431, a protection code generation circuit 433, a first encryption circuit 435, a second encryption circuit 437, a message combination circuit 439, and a MAC generation circuit 440.

The message 431 may separate a transmission target message into additional information (ADD(ADDITIONAL AUTHENTICATION DATA)), first information (HEADER & GENERIC SLOT), and second information (DATA SLOT).

Referring to FIG. 6, a message may be separated into a plurality of flits. Each flit may include a flit header (FLIT HEADER) and a plurality of slots. The slots may include a header slot (HEADER SLOT), a generic slot (GENERIC SLOT), and a data slot (DATA SLOT). In an embodiment, the first information may include the header slot (HEADER SLOT) and the generic slot (GENERIC SLOT). The second information may include the data slot (DATA SLOT). The additional information may include the flit header (FLIT HEADER).

The protection code generation circuit 433 may generate a protection code (PCRC) for the first information (HEADER & GENERIC SLOT) including the header slot and the generic slot, and may combine plain text (P-PLAINTEXT_HG) of the first information and the protection code (PCRC).

The first encryption circuit 435 may encrypt the plain text (P-PLAINTEXT_HG) of the first information with which the protection code (PCRC) has been combined. In an embodiment, the first encryption circuit 435 may be an encryption circuit that uses an advanced encryption standard-counter (AES-CTR) mode. In this case, the first encryption circuit 435 may generate first information (C_HG, ECRC) that has been encrypted by encrypting the plain text (P-PLAINTEXT_HG) of the first information, with which the protection code (PCRC) has been combined, based on an encryption key (K), an initiation vector (IV), and a counter value (INC).

The encryption information (i.e., the encryption key (K), the initiation vector (IV), and the counter value (INC)) that is used to encrypt the first information may be transmitted from the transmission circuit to the reception circuit.

The second encryption circuit 437 may encrypt plain text (P-PLAINTEXT_D) of the second information including the data slot (DATA SLOT).

In an embodiment, the second encryption circuit 437 may be an encryption circuit using the AES-CTR mode. In this case, the second encryption circuit 437 may generate second information (C_D) that has been encrypted by encrypting the plain text (P-PLAINTEXT_D) of the second information based on the encryption key (K), the initiation vector (IV), and the counter value (INC).

The encryption information (i.e., the encryption key (K), the initiation vector (IV), and the counter value (INC)) that is used to encrypt the second information might not be transmitted to the reception side.

The message combination circuit 439 may generate an encrypted message (ADD/C_HG/C_D/ECRC/LEN(A)/LEN(C)) by combining the additional information (ADD), the first information (C_HG, ECRC) that has been encrypted, the second information (C_D) that has been encrypted, and additional information (LEN(A), LEN(C)).

The MAC generation circuit 440 may generate a first MAC (MAC) based on the encrypted message (ADD/C_HG/C_D/ECRC/LEN(A)/LEN(C)). In an embodiment, the MAC generation circuit 440 may generate a hash value (GHASH(H)) from the encrypted message (ADD/C_HG/C_D/ECRC/LEN(A)/LEN(C)), and may encrypt the hash value (GHASH(H)) to generate and encrypted signal (AES-CTR(K)) based on the authentication key. Furthermore, the MAC generation circuit 440 may extract the most significant 96 bits ($MSB_{96}$) of the encrypted signal as the first MAC (MAC).

The encrypted message (ADD/C_HG/C_D/ECRC/LEN (A)/LEN(C)) and the first MAC (MAC) that have been generated as described above may be transmitted to another PCIe device through the physical interface circuit.

Figure 7:
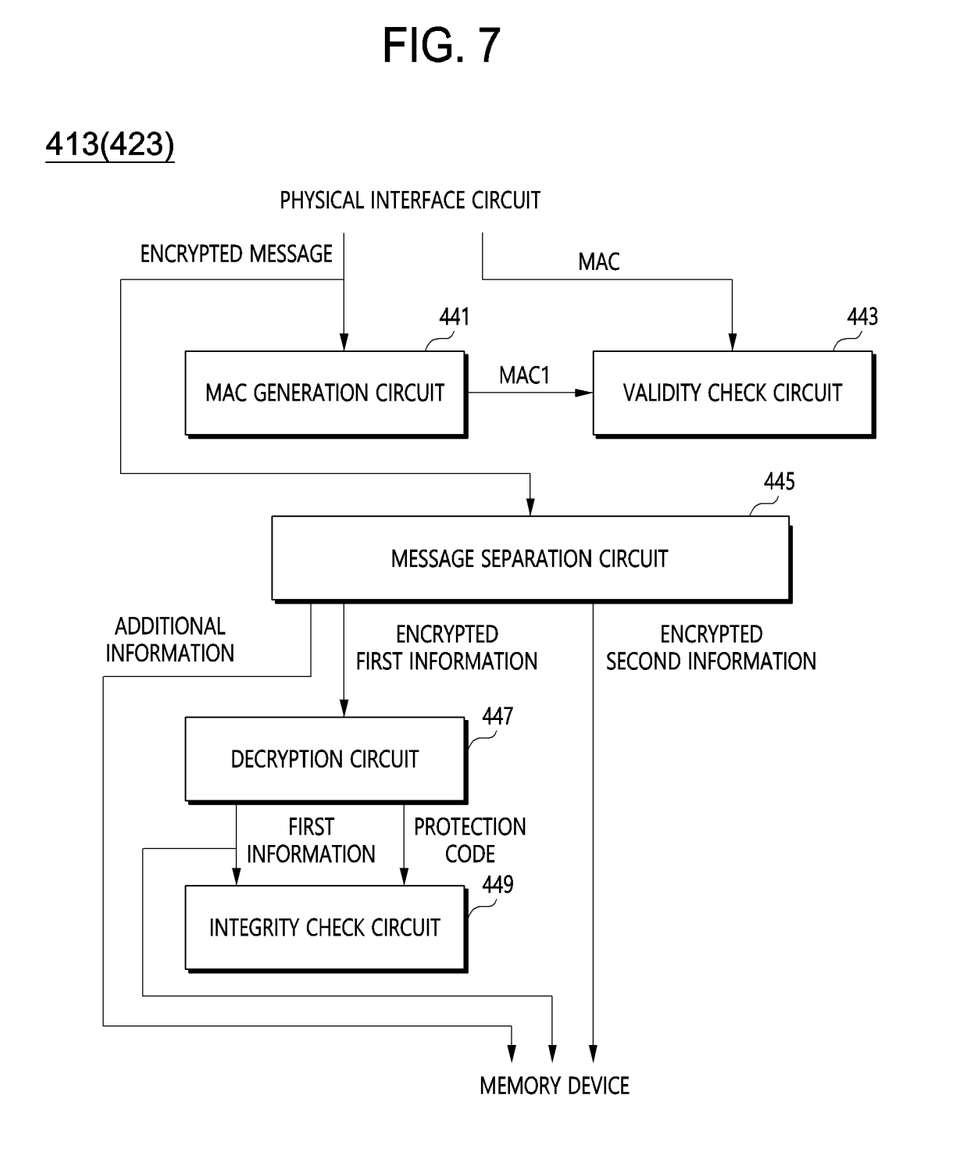
FIG. 7 is a diagram of a reception circuit according to an embodiment of the disclosure.
Figure 8:
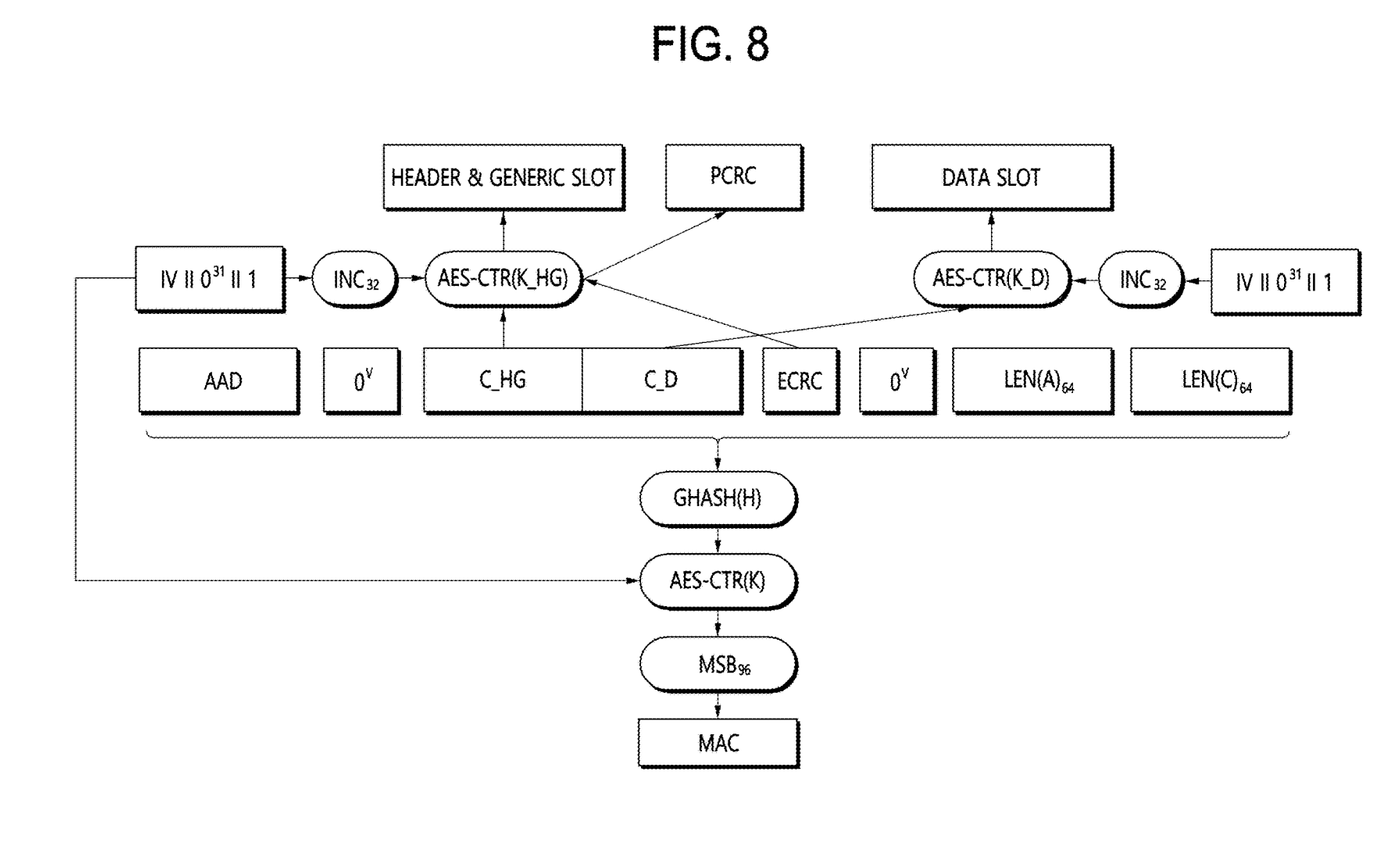
FIG. 8 is a diagram for describing a method of receiving a message according to an embodiment of the disclosure.

FIG. 7 is a construction diagram of a reception circuit according to an embodiment of the disclosure. FIG. 8 is a conceptual diagram for describing a method of receiving a message according to an embodiment of the disclosure.

Referring to FIG. 7, reception circuits 413, 423 according to an embodiment may include a MAC generation circuit 441, a validity check circuit 443, a message separation circuit 445, a decryption circuit 447, and an integrity check circuit 449.

The MAC generation circuit 441 may generate a second MAC (MAC1) from an encrypted message (ADD/C_HG/C_D/ECRC/LEN (A)/LEN(C)) that is received through the physical interface circuit.

In an embodiment, the MAC generation circuit 441 may generate a hash value (GHASH(H)) from the encrypted message (ADD/C_HG/C_D/ECRC/LEN(A)/LEN(C)), and may encrypt the hash value (GHASH(H)) to generate an encrypted signal (AES-CTR(K)) signal based on the authentication key. Furthermore, the MAC generation circuit 441 may extract the most significant 96 bits ($MSB_{96}$) of the encrypted signal as a second MAC (MAC1).

The validity check circuit 443 may check the validity of the encrypted message (ADD/C_HG/C_D/ECRC/LEN(A)/LEN(C)) by comparing the first MAC (MAC) that has been received through the physical interface circuit and the second MAC (MAC1) that has been generated by the MAC generation circuit 441. When the encrypted message (ADD/C_HG/C_D/ECRC/LEN(A)/LEN(C)) is not valid, a device including reception circuits 413, 423 may correct an error of the received message or may request the re-transmission of the message from the transmission side.

The message separation circuit 445 may separate the encrypted message (ADD/C_HG/C_D/ECRC/LEN(A)/LEN(C)) into additional information (ADD), first information (C_HG, ECRC) that has been encrypted, and second information (C_D) that has been encrypted.

The decryption circuit 447 may generate first information (HEADER & GENERIC SLOT) and a protection code (PCRC) by decrypting the first information (C_HG, ECRC) that has been encrypted.

In an embodiment, the decryption circuit 447 may be a decryption circuit using the AES-CTR mode. In this case, the decryption circuit 447 may decrypt the first information (C_HG, ECRC) that has been encrypted based on an encryption key (K), an initiation vector (IV), and a counter value (INC) that have been transmitted by the transmission side.

The integrity check circuit 449 may check the integrity of the first information (HEADER & GENERIC SLOT) that has been decrypted based on the protection code (PCRC) that has been decrypted.

The additional information, the protection code (PCRC) that has been decrypted, the first information (HEADER & GENERIC SLOT) that has been decrypted, and the second information (C_D) that has been encrypted may be stored in a memory device. That is, the confidentiality of a data slot outside of the data link layer can be improved because the second information (C_D) that has been encrypted is not decrypted and is stored in the memory device in the encrypted state.

As described above, those skilled in the art to which the present technology pertains may understand that the present technology may be implemented in various other forms without departing from the technical spirit or essential characteristics of the present technology. Accordingly, it is to be understood that the aforementioned embodiments are illustrative from all aspects not being limitative. The scope of the present technology is defined by the appended claims rather than by the detailed description, and all modifications or variations derived from the meanings and scope of the claims and equivalents thereof should be understood as being included in the scope of the present technology.

What is claimed is:

1. A storage system comprising:
   a first device comprising a transmission circuit configured to encrypt a first information of a transmission target message generating encrypted first information, to encrypt a second information of the transmission target message generating encrypted first information, and to transmit the encrypted first information and the encrypted second information; and
   a second device comprising a reception circuit configured to receive the encrypted first information and the encrypted second information from the first device, to decrypt the encrypted first information and to store a decrypted first information and the encrypted second information in a memory device,
   wherein the transmission target message comprises a plurality of flits, and each off the plurality of flits comprises flit header, header slots, generic slots, and data slots,
   the first information comprises the header slots and the generic slots, and
   the second information comprises the data slots.

2. The storage system of claim 1, wherein the transmission circuit
   transmits a first encryption information used to encrypt the first information to the second device, and
   does not transmit a second encryption information used to encrypt the second information to the second device.

3. The storage system of claim 1, wherein the transmission circuit is configured to
   separate the transmission target message into additional information, the first information, and the second information,
   generate a protection code from the first information and generate the encrypted first information by encrypting the first information and the protection code,
   generate a first message authentication code from an encrypted transmission target message in which the additional information, the encrypted first information, and the encrypted second information have been combined, and
   transmits the encrypted transmission target message and the first message authentication code to the second device.

4. The storage system of claim 3, wherein the reception circuit is configured to
   generate a second message authentication code from the encrypted transmission target message that has been received from the first device and check a validity of the encrypted transmission target message by comparing the second message authentication code with the first message authentication code, extract the encrypted first information from the encrypted transmission target message and check an integrity of the encrypted transmission target message by generating the first information and the protection code by decrypting the encrypted first information, and store, in the memory device, the additional information and the encrypted second information that have been extracted from the encrypted transmission target message and the first information and the protection code that have been decrypted and generated.

5. An operating method of a storage system comprising a first device and a second device, the operating method comprising:

generating, by the first device, encrypted first information by encrypting a first information of a transmission target message and generating encrypted second information by encrypting a second information of the transmission target message;

transmitting, by the first device, the encrypted first information and the encrypted second information;

decrypting, by the second device, the encrypted first information received from the first device; and storing, by the second device, the first information that has been decrypted and the encrypted second information in a memory device, wherein the transmission target message comprises a plurality of flits, and each of the plurality of flits comprises flit header, header slots, generic slots, and data slots, the first information comprises the header slots and the generic slots, and the second information comprises the data slots.

6. The operating method of claim 5, further comprising:

transmitting, by the first device, first encryption information that has been used to encrypt the first information to the second device, and not transmitting second encryption information that has been used to encrypt the second information to the second device.

7. The operating method of claim 5, further comprising:

separating, by the first device, the transmission target message into additional information, the first information, and the second information, generating, by the first device, a protection code from the first information and generating the encrypted first information by encrypting the first information and the protection code, generating, by the first device, a first message authentication code from an encrypted message in which the additional information, the encrypted first information, and the encrypted second information have been combined, and transmitting, by the first device, the encrypted message and the first message authentication code to the second device.

8. The operating method of claim 7, further comprising:

generating, by the second device, a second message authentication code from the encrypted message that has been received from the first device and checking a validity of the encrypted message by comparing the second message authentication code with the first message authentication code, extracting, by the second device, the encrypted first information from the encrypted message and checking an integrity of the encrypted message by generating the first information and the protection code by decrypting the encrypted first information, and storing, by the second device, the additional information and the encrypted second information that have been extracted from the encrypted message and the first information and the protection code that have been decrypted and generated in the memory device.

9. A storage system comprising:

a device comprising a circuit configured to generate encrypted first information by encrypting first information other than data slots from a transmission target message comprising the data slots, to generate encrypted second information by encrypting second information comprising the data slots, and to transmit an encrypted message comprising the encrypted first information and the encrypted second information through a physical interface circuit, wherein the transmission target message comprises a plurality of flits, and each of the plurality of flits comprises a flit header, header slots, generic slots, and the data slots, the first information comprises the header slots and the generic slots, and the second information comprises the data slots.

10. The storage system of claim 9, wherein the device generates a protection code from the first information, and generates the encrypted first information by encrypting the first information and the protection code.

11. The storage system of claim 9, wherein the device generates a first message authentication code from the encrypted message comprising the encrypted first information and the encrypted second information, and transmits the encrypted message and the first message authentication code through the physical interface circuit.

12. A storage system comprising:

a device comprising a circuit configured to extract encrypted first information from an encrypted message that has been received through a physical interface circuit, to generate first information by decrypting the encrypted first information using encryption information that has been received through the physical interface circuit, to extract encrypted second information from the encrypted message, and to store the first information that has been decrypted and the encrypted second information in a memory device, wherein the encrypted first information is generated by encrypting first information comprising header slots and generic slots among a transmission target message in a transmission circuit, and the encrypted second information is generated by encrypting a second information comprising data slots among the transmission target message in the transmission circuit.

13. The storage system of claim 12, wherein the device generates a protection code that is associated with the first information by decrypting the encrypted first information.

14. The storage system of claim 12, wherein the device receives a first message authentication code through the physical interface circuit, and compares a second message authentication code that has been generated from the encrypted message with the first message authentication code.

* * * * *